United States Patent [19]
Moreau

[11] Patent Number: 5,285,746
[45] Date of Patent: Feb. 15, 1994

[54] SELF-INDEXING EXIT GATE FOR MILKING PARLOR

[75] Inventor: Joseph R. Moreau, New Hartford, N.Y.

[73] Assignee: Norbco, Inc., Westmoreland, N.Y.

[21] Appl. No.: 14,551

[22] Filed: Feb. 5, 1993

[51] Int. Cl.⁵ ............................................. A01K 1/12
[52] U.S. Cl. .................................. 119/14.03; 119/27; 119/752
[58] Field of Search ............... 119/14.03, 14.04, 27, 119/147.1, 148

[56] References Cited

U.S. PATENT DOCUMENTS

| | | | |
|---|---|---|---|
| 3,166,044 | 1/1965 | Darling | 119/27 |
| 3,785,346 | 1/1974 | Dower | 119/27 |
| 4,977,856 | 12/1990 | Norwood | 119/14.03 |
| 5,203,280 | 4/1993 | Nelson | 119/14.03 |

FOREIGN PATENT DOCUMENTS

| | | | |
|---|---|---|---|
| 2305125 | 10/1976 | France | 119/27 |
| 2565778 | 12/1985 | France | 119/14.03 |

*Primary Examiner*—Gene Mancene
*Assistant Examiner*—Todd E. Manahan
*Attorney, Agent, or Firm*—Harris Beach & Wilcox

[57] ABSTRACT

A self-indexing exit gate for a side-by-side milking parlor has a yoke member that is cantilevered on a sleeve that is journaled on an overhead rotary pivot bar. A latch member affords a limited amount of play between the sleeve member and the pivot bar. A pneumatic cylinder rotates the pivot bar between the first and second positions, which correspond to lowered and raised positions of the exit gate yoke member. The yoke member has a center of gravity positioned somewhat distally of the rotary shaft, which provides a small amount of play, that is, about six inches, at the point of contact with the shoulders of the cow. The latch member permits individual release of a cow from her stall without affecting the exit gates of the other stalls in the dairy parlor.

17 Claims, 3 Drawing Sheets

SELF-INDEXING EXIT GATE FOR MILKING PARLOR

BACKGROUND OF THE INVENTION:

The present invention relates in general to the field of cattle stalls, and in particular to milking parlors and milking stalls designed for compactness, efficient parlor operation, and maximum comfort for the cows.

The milking parlor generally consists of an array of individual stalls, each designed to hold a cow or other dairy animal while she is being milked. An attendant or operator is usually required to be present at the parlor to perform such tasks as ensuring that the animals are properly situated in the stalls; washing the udders prior to milking; applying milker units; and monitoring and attending to the operation of the milking units. The attendant also ensures that the cows to be milked enter the dairy parlor through an entrance gate, and that they exit the dairy parlor through an exit gate when the milking is completed.

A recent development of parlor design is the so called side-by-side or parallel stall configuration. Here, the cow is positioned facing outwardly from the operator and milking takes place at the rear of the cow, that is, between the hind legs. Variations of this design include a V-shaped parlor arrangement and a curved parlor arrangement, the later being discussed in U.S. Pat. No. 5,000,119, having the same assignee as this matter.

These side-by-side parlors are designed so that cows enter through an entry gate into an aisle or pathway along the rear side of the parlor, and then turn approximately 90 degrees and enter the furthest stall that is not yet occupied by a cow. A scheme of sequencing gates can be employed to ensure that the cows proceed to the proper stall.

The milking parlor generally has a rear wall that defines one side of the entry aisle, dividers that serve as side walls, and an exit gate at the front of each stall. The rear wall, which can contain a kick bar and a manure shield, for example, defines the milker position. The cow's hind legs are to be positioned against this wall. The front or exit gate can be of a sideways swinging or race gate design, with doors that swing open to release the cow, or can be of an upward swinging or yoke-type design, which moves upward or above the cow to release her from the stall. The sequencing gate can form a part of the side wall that separates the cows from one another.

The cow stalls have a predetermined length, i.e., between the rear wall and the front gate when the same is in its lowered or closed position. However, the cows are not all of the same predetermined length from hind legs to shoulder. Consequently, an indexing system is desirable for a milking parlor of this type. The term "indexing" simply means adjusting the length of each stall of the milking parlor so that the rear legs of the cow are at the rear wall, that is, at the milker position. Indexing can be carried out by adjusting the stall length, i.e., the distance from the exit gate to the rear kick rail or manure shield, to correspond to the length of the cow in the dairy parlor stall. This can be accomplished by moving the front or exit gates back by means of pneumatic cylinders.

In indexing dairy parlor current systems, gang indexing is most frequently employed. For gang indexing, a single pneumatic cylinder adjusts the position of all of the exit gates of a group of cattle stalls in a milking parlor. Adjusting the gates as a group is considered easier and more cost effective than individual indexing using individual pneumatic cylinders. Fewer pneumatic actuators, fewer controls are required. However, gang indexing is useful only when all of the cows that are being milked at any one time are approximately the same length.

Also, in a pneumatic indexing scheme, in addition to the cylinders required for lifting and lowering the gates to release the cows after milking, an additional set of cylinders is commonly used for indexing. The additional cylinder is needed because pneumatic actuators when used for partial stroke operation require rather complex control equipment such as limit switching and special valves.

OBJECTS AND SUMMARY OF THE INVENTION

Accordingly, it is an object of this invention to improve the design of exit gates for side-by-side milking parlors and to facilitate the indexing, i.e. length adjustment of the stalls, to accommodate cows of varying lengths.

It is another object to provide a self-indexing exit gate for dairy parlors which avoids the drawbacks of the prior art.

It is a further object of this invention to provide individual indexing of dairy parlor stalls to accommodate cows of various sizes, even if cows of significantly different lengths are milked in the dairy parlor at one time.

It is a still further object of this invention to provide a self-indexing exit gate which permits individual release of cows, if necessary.

It is yet another object of this invention to provide a simple and efficient dairy parlor exit gate which achieves indexing with minimal operator intervention.

It is yet a further object to provide a low-maintenance self-indexing exit gate which permits the pneumatic actuating system to be designed as simple as possible to accomplish the raising and lowering of the exit gates and the indexing of the gates as well.

According to an aspect of this invention, a self-indexing exit gate assembly is provided for a dairy parlor in which the exit gate assembly defines a distal limit of the dairy parlor milking stall, and is rotatably liftable about a transverse axis to release the cow from the associated stall. An overhead horizontal rotary shaft is journaled in a frame of the dairy parlor. An actuator device and suitable linkages rotate the shaft between first and second angularly separated positions, which correspond to raised and lowered positions of the exit gate assembly. A sleeve member mounted on the shaft has at least a limited amount of rotational freedom with respect to the shaft. The exit gate assembly also has a yoke affixed onto the sleeve member, and projecting from it. The yoke releaseably bears against the shoulders of the cow within the stall. The yoke assembly has at least one yoke member, and preferably a pair of S-shaped yoke members that are cantilevered on the sleeve member and project distally and downwardly. The yoke member has a center of gravity positioned somewhat distally of the rotary shaft. A latching arrangement is positioned on the sleeve member and the shaft for locking the sleeve member and shaft, so that the sleeve member rotates with the shaft. Rotating the shaft from its first to its second position raises the yoke to release the cow from the stall, while rotating the shaft from its second to its first position returns the yoke to its lowered positioned to close off the distal end of the stall. The latching arrangement affords sufficient rotational play between the sleeve member and shaft to produce a corresponding amount of play, which is on the order of about six inches, in the yoke member, taken at a point of contact with the cow's shoulders. This position is approximately thirty-six inches above the floor of the cow stand. With this amount of play, the yoke assembly pushes by gravity proximately against the cow's shoulders, and urges the cow gently towards the proximal or back side of the stall. This ensures that all cows, for a wide variety of lengths, will be properly positioned with their hind legs at the proximal end of the stall, that is at the milker position.

In a preferred construction, the yoke assembly includes a pair of yoke members that each have a curved profile, such as an S-shaped, J-shaped or L-shaped profile. A horizontal throat bar joins the free ends of the pair of yoke members. In addition, a pair of shoulder yoke members can be positioned at facing sides of each of the pair of yoke members, these define a narrow opening between them for engaging the shoulders of the cows. The shoulder yoke members terminate above and below the narrow opening and define wider openings above and below the narrow opening. The shoulder yoke members are preferably angled somewhat with respect to the associated yoke members, so that shorter cows and taller cows are contacted at somewhat different positions by the shoulder yolk members. Shorter cows contact the shoulder yokes at a lower level, effectively reducing the length of the stalls.

The latching arrangements for the exit gates have movable members which can be selectively moved between engaged and release positions. The movable member is fixed in the rotational direction, but can be moved outward, and can be selectively moved to the release position for individually releasing a cow without releasing the other cows from the milking parlor. The angular play can be achieved with a circumference gap in the latching arrangement into which the movable latch member fits when in an engaged position, this gap being somewhat larger than the width of the movable member.

The above and many other objects, features, and advantages of this invention will be, apparent from the ensuing description of an illustrated preferred embodiment, when read in conjunction with the accompanying Drawing.

DETAILED DESCRIPTION OF THE PREFERRED EMBODIMENT

Figure 1:
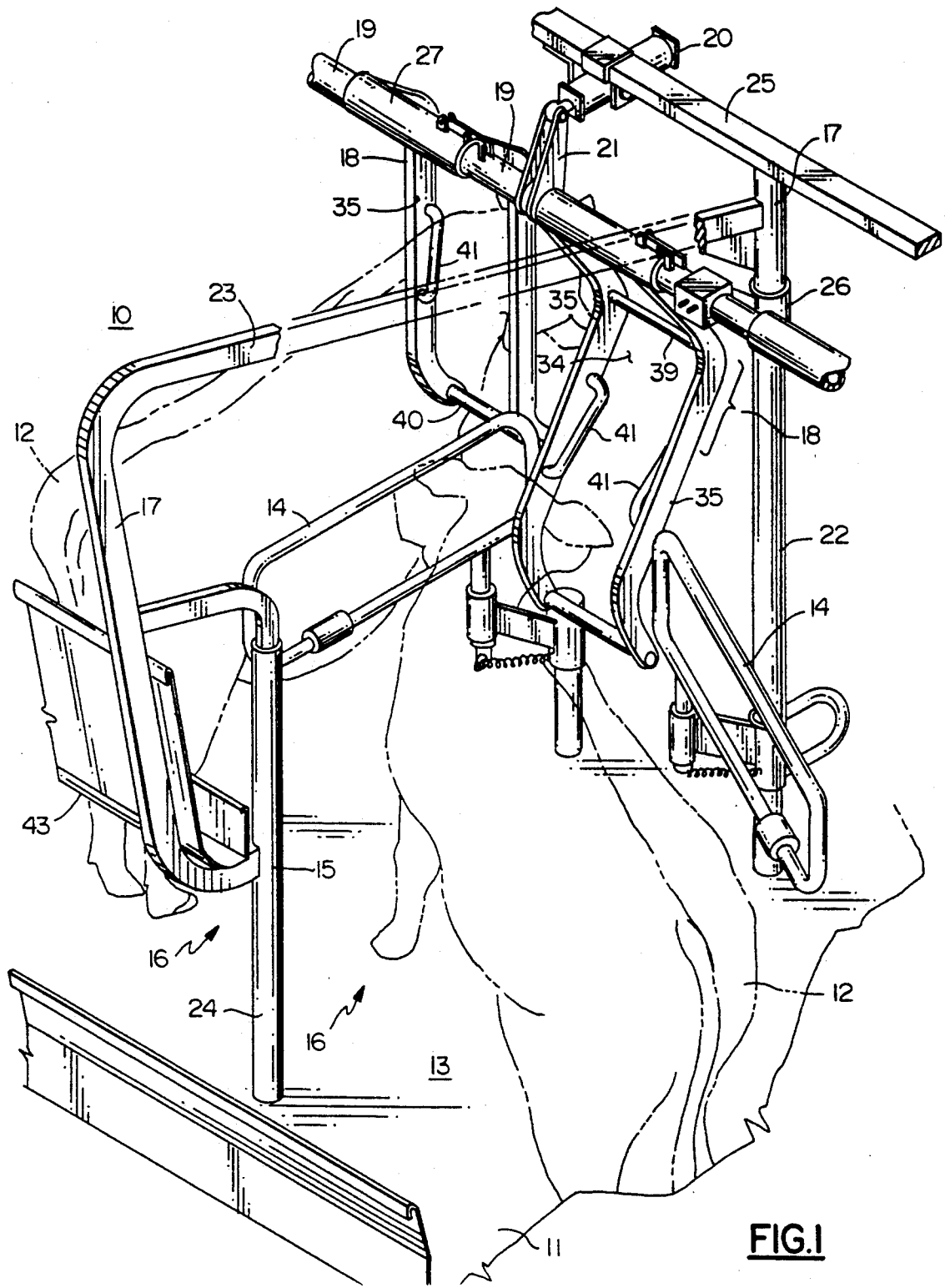
FIG. 1 is a perspective view of a portion of a side-by-side dairy parlor, featuring a gravity-indexing exit gate assembly according to one preferred embodiment of this invention.

With reference to the Drawing, and initially to FIG. 1, a milking parlor 10 according to a preferred embodiment of this invention is assembled onto a cow stand or floor 11. Here a cow 12 is shown proceeding along an entry aisle 13 that is formed between sequencing gates 14 on one side and a manure shield 15 on the other, which shield 15 forms a proximal or back wall for parallel cow stalls 16 of the milking parlor. When the cows enter the stalls 16, the sequencing gates 14 are turned by the cows 12 and form a portion of the side walls of the stalls 12. At that point, the manure shield 15 forms a back wall while exit gates 18 supported on a support frame 17 serve as front walls for the stalls 16. In this case, the exit gates 18 are self indexing, and are journaled on a horizontal overhead pivot bar or shaft 19 supported on the frame 17 above the cows 12. A pneumatic cylinder-type actuator 20 has its rod connected to a pivot arm 21 that is affixed to the pivot shaft 19.

The support frame 17 has, for stall 16, a front post 22 and an L-shaped overhead rail 23 or arch which supports the shield 15. The rails or arches 23 are supported on the posts 22. Support posts 24 are embedded in the cow stand 11 and outermost ones of these support the rails 23. A transverse beam 25 is supported on top of the posts 22, and, in this embodiment, supports the cylinder 20. A support bracket 26 is mounted upon the front post 22 and journals the pivot shaft 9.

Figure 2:
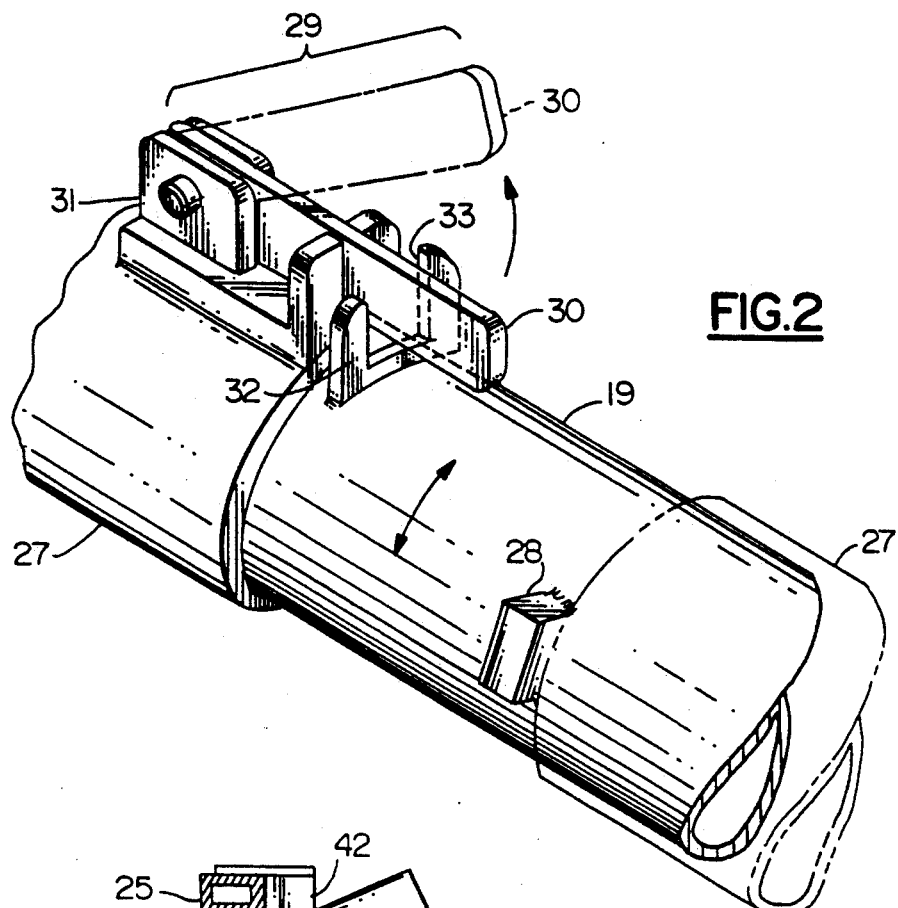
FIG. 2 is an enlarged perspective view showing details of a latching assembly of the exit gate.
Figure 4:
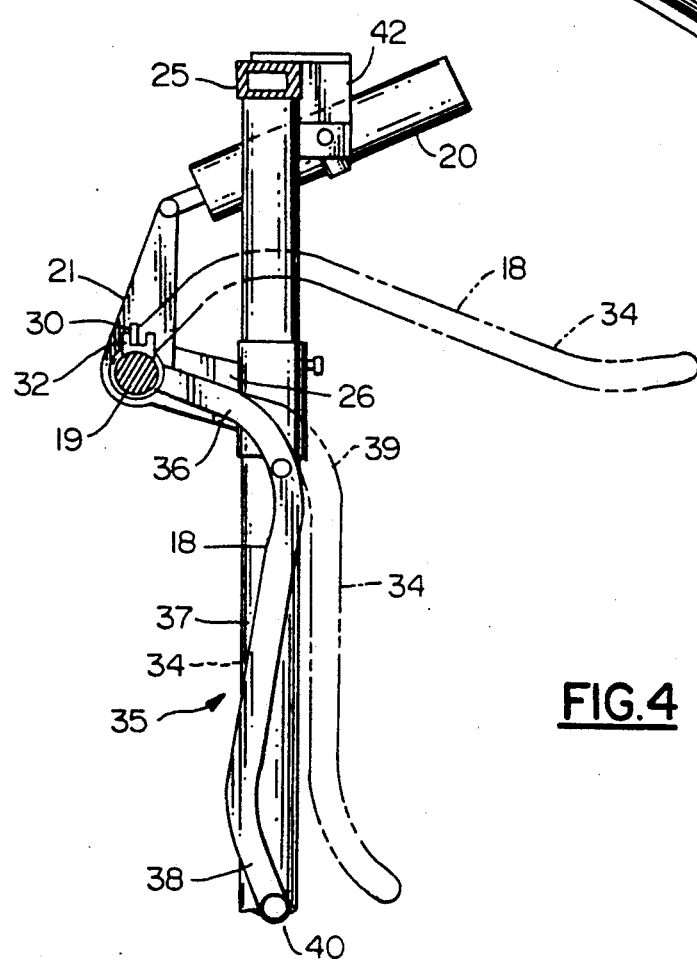
FIG. 4 is an elevational cross section of the exit gate assembly.
Figure 3:
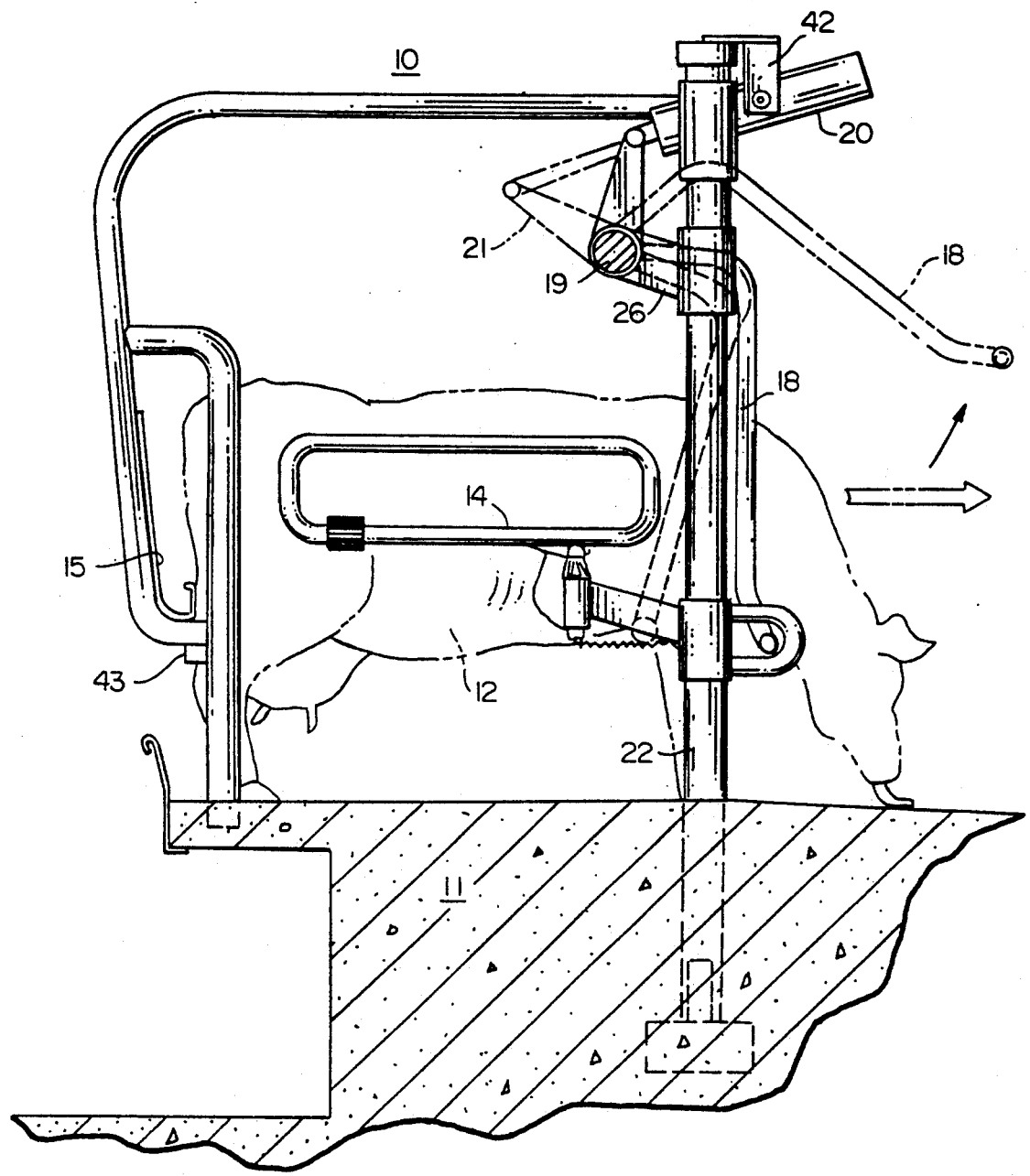
FIG. 3 is a side elevation of a cow stall, showing the indexing action of the exit gate.

As shown with reference also to FIGS. 2-4, each exit gate 18 has a tubular horizontal sleeve 27 that is journaled on the pivot shaft 19 and is allowed at least some rotational freedom with respect to the shaft 19. An axial stop member 28, here welded on the shaft 19, limits the axial movement of the sleeve 27. On the end of the sleeve 27 opposite the stop 28 is a latch member 29 shown in detail in FIG. 2. The latch member has a swing bar 30 that can be selectively lifted (to the position shown in ghost in FIG. 2) and has one end pivotally attached to a mount 31 that is affixed to the sleeve 27. A corresponding bracket 32 is affixed, i.e. by welding, onto the shaft 19, and this bracket has a circumferential gap 33 to accommodate the swing bar 30. Here, the width of the gap 33 is somewhat greater than the width of the bar 30, and this creates a rotational play of several degrees between the shaft 19 and the sleeve 27. The swing bar 30 is selectively lifted generally in a radial direction, to disengage with the bracket 32 for release of an individual cow from the milking parlor 10, as discussed later.

As shown in FIGS. 1, 3, and 4, each exit gate 18 has a yoke member 34 that is cantilevered on the associated sleeve member 27. In this embodiment each yoke member 34 comprises a parallel pair of arcuate arms or members 35. These members 35 have a generally S-shaped profile, with an upper proximal portion 36 that extends outward and then continues somewhat forward from the sleeve 27, a second portion 37 that extends generally downward when the exit gate 18 is in its closed position, and a lower curved portion 38 at the distal or free end of the arcuate yoke members. An upper support bar 39 extends transversely between the knees formed between the upper and second portions 36, 37 of each pair of arcuate members 35. A lower or throat bar 40 extends transversely between and free ends of these members 35. These bars 39, 40 provide reinforcement for the yoke members.

A pair of shoulder yokes 41 are affixed onto facing sides of these arcuate members 35. In this embodiment the shoulder yokes are C-shaped bars attached on the inner or facing sides of each of the members 35. The shoulder yokes 41 define a narrowed portion between them with a wider portion above the upper ends and another wider portion below the lower ends. These shoulder yokes 41 engage the shoulders of the cow within the associated cow stall 16. Preferably, the shoulder yokes are slanted somewhat back, considered from top to bottom as shown in FIG. 1, so that the upper end of the shoulder yoke is displaced slightly forward of its lower end. This slanting or raking of the shoulder yoke 41 engages the shoulders of smaller cows farther back in the stall than shoulders of larger cows, to assist in indexing.

As shown in FIGS. 3 and 4, the cylinder 20 is held on a trunnion mount 42 that is affixed onto the transverse beam 25 of the dairy parlor support frame 17. In this arrangement, when the cylinder 20 is in its unactuated or retracted condition, the gate 18 is in a downward or closed position, as shown in solid lines in FIGS. 3 and 4. When the cylinder 20 is actuated, i.e. with its rod extended, gate 18 is lifted to its release position as shown in chain lines in FIGS. 3 and 4. In the latter position, the yoke member 34 is positioned over the cow's head, and the cow is free to leave the stall and proceed down the exit lane and out of the dairy parlor.

The indexing feature of this embodiment of the invention operates as follows:

When a cow 12 enters the cow stall 16 in the dairy parlor, she places her head between yoke members 35 and her shoulders engage the shoulder yokes 41, 41. The cow continues to push forward against the exit gate member 18 and urges the same distally, or forward, until she is entirely inside her stall 16. At this point, the yoke member 34 is displaced forward of its initial position, i.e. to the position shown in the double chain line in FIG. 4. The cantilevered yoke member 34 has its center of gravity displaced forward of the axis defined by the pivot shaft 19. The yoke 34 is gravitationally urged back towards the solid line position in FIG. 4, and bears on the cow's shoulders with a force of about five to twenty-five pounds. This urges her gently rearward until her rear legs are positioned against the manure shield and against the kick rail 43 that extends transversely beneath it. With the cow in this position, she is advantageously positioned as close to the milker as possible. She is also held comfortably in a stable position in the stall 16, preventing her from moving about or from possibly injuring herself.

If an attendant needs to release an individual cow, among the group of cows 12, from her stall, the attendant only needs to lift the latch swing bar 30 out of engagement with the latch bracket 32. Then the yoke 34 can be rotated freely, and lifted above the cow, and she can exit the stall. This does not affect the action of any of the other exit gates 18 in the parlor.

After a milking operation, the operator actuates the cylinder 20, which rotates the shaft 19 to lift all the exit gates 18 to their upper or release positions. Then the cows can exit in the direction shown by the arrow in FIG. 3. After the group of cows have departed along an exit lane to the outside of the milking parlor, the attendant again actuates the cylinder to release the air pressure. This drops the exit gates gradually to the closed position, and a new group of cows to be milked enters the milking parlor.

In this preferred embodiment, the gate yoke members 35 are of an S-shaped profile. This permits the gate 34 to be lifted somewhat higher above the cows when the cows exit the stalls. This also places the center of gravity somewhat more forward than if the free end of the yoke members 35 were straight rather than curved.

In this embodiment, there is about six inches of play in the yoke members 34 at a height about 36 inches above the floor of the cow stand 11. This height corresponds approximately to the position of the cow's shoulders. The resulting six inches of play will accommodate most breeds of dairy cows, while keeping to a minimum the amount of waste motion between the journal and the pivot bar or shaft.

The swing bar latch system, as shown in detail in FIG. 2, is simply one example of a latch, and many variations are possible which will provide at least some angular play between the pivot shaft 19 and the sleeve 27, and will also permit individual release of the cow.

In this embodiment, gravity indexing is employed. However, gravity indexing can be supplemented by air indexing, either with an additional cylinder or with an air modulation pressure to the main cylinder 20. Also, rather than having individually indexing gates, as in this embodiment, gang indexing is possible in which a single transverse tube 27 has a number of yoke members 34 cantilevered from it, with a single latch mechanism 30 provided for the entire group of exit gates. Furthermore, other styles of parlors, besides this parallel or side-by-side type can be equipped with exit gates such as this. For example, these exit gates can be employed in a diagonal or herringbone style dairy parlor, or can be employed in parlors that do not have sequencing gates.

While this invention has been described in detail with reference to certain preferred embodiments, it should be apparent that the invention is not limited to those precise embodiments. Rather, many modifications and variations will present themselves to those of skill in the art without departing from the scope and spirit of this invention, as defined in the appended claims.

What is claimed is:

1. Gravity indexing exit gate assembly for a milking stall of a dairy parlor, said exit gate assembly defining a distal side of the stall and being rotatably liftable to release a cow from the associated stall; said exit gate assembly comprising:
   an overhead horizontal rotary shaft journaled in a frame of said parlor;
   means for rotating said shaft between first and second angularly separated positions;
   a sleeve member mounted on said shaft;
   yoke means affixed onto said sleeve member for releasable bearing against shoulders of the cow within the associated stall, including at least one yoke member that projects distally and then downwardly such that the yoke member has a center of gravity positioned distally of said rotary shaft; and
   locking means positioned on said sleeve member and said shaft for rotatably locking the sleeve member to rotate with said shaft so that rotating said shaft from its first to its second position raises said yoke member to release the cow from the stall, and rotating the shaft from its second position to its first position returns the yoke means to a lowered position to close off the distal side of the stall;
   said locking means including means for affording sufficient rotational play between predetermined limits said sleeve member and said shaft to produce a corresponding play on the order of six inches in the yoke member at a point of contact with the cow's shoulders, so that the yoke member yieldably urges the cow gently towards the proximal side of said stall.

2. The exit gate assembly of claim 1 wherein said yoke means includes a pair of said yoke members each having a curved profile.

3. The exit gate assembly of claim 2 further including a horizontal throat bar joining free ends of said pair of yoke members.

4. The exit gate assembly of claim 2 wherein said yoke members each have a generally S-shaped profile.

5. The exit gate assembly of claim 1 wherein a plurality of exit gates are provided for a plurality of side-by-side stalls of said milking parlor, for each said stall a respective sleeve member is mounted on said shaft, and respective said locking means are positioned on said sleeves and said shaft.

6. Gravity indexing exit gate assembly for a milking stall of a dairy parlor, said exit gate assembly defining a distal side of the stall and being rotatably liftable to release a cow from the associated stall; said exit gate assembly comprising:

an overhead horizontal rotary shaft journaled in a frame of said parlor;

means for rotating said shaft between first and second angularly separated positions;

a sleeve member mounted on said shaft;

yoke means affixed onto said sleeve member for releasably bearing against shoulders of the cow within the associated stall, including a pair of yoke members that project distally and then downwardly such that the yoke members have a center of gravity positioned distally of said rotary shaft; and locking means positioned on said sleeve member and said shaft for rotatably locking the sleeve member to rotate with said shaft so that rotating said shaft from its first to its second position raises said yoke member to release the cow from the stall, and rotating the shaft from its second position to its first position returns the yoke means to a lowered position to close off the distal side of the stall;

wherein said yoke means includes a pair of shoulder yoke members positioned at facing sides of each of said pair of yoke members and defining a narrow opening therebetween for engaging said cow, said shoulder yoke members terminating above and below said narrow opening to define upper and lower wider openings.

7. The exit gate assembly of claim 6 wherein said yoke members each include a downwardly extending leg having a proximal side and a distal side, and the associated shoulder yoke members are angled so that lower ends thereof are positioned adjacent the proximal sides of the associated legs and upper end thereof are positioned adjacent the distal sides of the associated legs.

8. Gravity indexing exit gate assembly for a milking stall of a dairy parlor, said exit gate assembly defining a distal side of the stall and being rotatably liftable to release a cow from the associated stall; said exit gate assembly comprising:

an overhead horizontal rotary shaft journaled in a frame of said parlor;

means for rotating said shaft between first and second angularly separated positions;

a sleeve member mounted on said shaft;

yoke means affixed onto said sleeve member for releasably bearing against shoulders of the cow within the associated stall, including at least one yoke member that projects distally and then downwardly such that the yoke member has a center of gravity positioned distally of said rotary shaft; and locking means positioned on said sleeve member and said shaft for rotatably locking the sleeve member to rotate with said shaft so that rotating said shaft from its first to its second position raises said yoke member to release the cow from the stall, and rotating the shaft from its second position to its first position returns the yoke means to a lowered position to close off the distal side of the stall;

wherein said locking means includes a latch member affixed onto one of said sleeve member and said shaft and having a movable member which is selectively movable between engaged and released positions, but is fixed angularly with respect to said one of said sleeve member and said shaft; and cooperating means on the other of said sleeve member and said shaft for engaging said movable member when the latter is in its engaged position.

9. The exit gate assembly of claim 8 wherein said locking means includes means for affording sufficient rotational play between said sleeve member and said shaft to produce a corresponding play on the order of six inches in the yoke member at a point of contact with the cow's shoulders, so that the yoke member yieldably urges the cow gently towards the proximal side of said stall.

10. The exit gate assembly of claim 9 wherein said cooperating means has a circumferential gap in which said movable member is positioned when in said engaged position and which serves to afford said rotational play.

11. Side-by-side milking parlor of the type in which a back wall, a plurality of dividers, and an exit gate assembly formed as a series of exit gates define a plurality of side-by-side cow stalls, said exit gates being suspended from said cow stalls and being rotatably liftable to release the cows from the associated stalls and lowerable to define distal sides of said stalls and to contact shoulders of the cows while the cows are being milked; the exit gate assembly comprising:

an overhead horizontal rotary shaft journaled in a frame of said milking parlor and traversing above distal ends of said cow stalls;

means for rotating said shaft between first and second rotary positions;

a plurality of sleeve members each journaled on said shaft at a position above a respective one of said stalls;

a plurality of yoke means each affixed onto a respective sleeve member for yieldably bearing against shoulders of the cow within the associated stall, including at least one yoke member that projects distally and then downwardly from the associated sleeve member such that the yoke member has a center of gravity positioned distally of said rotary shaft; and locking means positioned on said sleeve members and said shaft for rotatably locking the respective sleeve members to rotate with said shaft so that rotating said shaft from its first to its second position raises the yoke means of said exit gate assembly to release the cows from their stalls, and rotating the shaft from its second position to its first position returns the yoke means to a lowered position to close off the distal sides of the stalls;

said locking means affording a predetermined rotational play between predetermined limits said sleeve members and said shaft to produce a corresponding play on the order of six inches in the yoke means at a point of contact with the cow's shoulders, so that the yoke members yieldably urge the cows gently towards the proximal sides of said stalls.

12. Side-by-side milking parlor according to claim 11 wherein each said yoke means includes a pair of parallel yoke members having a curved profile.

13. Side-by-side milking parlor according to claim 11 wherein each said yoke member has a generally S-shaped profile.

14. Side-by-side milking parlor of the type in which a back wall, a plurality of dividers, and an exit gate assembly formed as a series of exit gates define a plurality of side-by-side cow stalls, said exit gates being suspended from said cow stalls and being rotatably liftable to release the cows from the associated stalls and lowerable to define distal sides of said stalls and to contact shoudlers of the cows while the cows are being milked; the exit gate assembly comprising:

an overhead horizontal rotary shaft journaled in a frame of said parlor and traversing above distal ends of said cow stalls;

means for rotating said shaft between first and second rotary positions;

a plurality of sleeve members each journaled on said shaft at a position above a respective one of said stalls;

a plurality of yoke means affixed onto a respective sleeve member for yieldably bearing against shoulders of the cow within the associated stall, including at least one yoke member that projects distally and then downwardly from the associated sleeve member such that the yoke member has a center of gravity positioned distally of said rotary shaft; and locking means positioned on said sleeve members and said shaft for rotatably locking the respective sleeve members to rotate with said shaft so that rotating said shaft from its first to its second position raises the yoke means of said exit gate assembly to release the cows from their stalls, and rotating the shaft from its second position to its first position returns the yoke means to a lowered position to close off the distal side of the stalls;

wherein each of said yoke means includes a pair of parallel main yoke members having a curred profile and associated shoulder yoke members positioned at facing sides of said pair of main yoke members, and defining a narrow opening therebetween for engaging the shoulders of said cow, said shoulder yoke members terminating above and below said narrow opening to define upper and lower wider openings.

15. Side-by-side milking parlor of the type in which a back wall, a plurality of dividers, and an exit gate assembly formed as a series of exit gates define a plurality of side-by-side cow stalls, said exit gates being suspended from said cow stalls and being rotatably liftable to release the cows from the associated stalls and lowerable to define distal sides of said stalls and to contact shoulders of the cows while the cows are being milked; the exit gate assembly comprising:

an overhead horizontal rotary shaft journaled in a frame of said milking parlor and traversing above distal ends of said cow stalls;

means for rotating said shaft between first and second rotary positions;

a plurality of sleeve members each journaled on said shaft at a position above a respective one of said stalls;

a plurality of yoke means each affixed onto a respective sleeve member for yieldably bearing against shoulders of the cow within the associated stall, including at least one yoke member that projects distally and then downwardly from the associated sleeve member such that the yoke member has a center of gravity positioned distally of said rotary shaft; and locking means positioned on said sleeve members and said shaft for rotatably locking the respective sleeve members to rotate with said shaft so that rotating said shaft from its first to its second position raises the yoke means of said exit gate assembly to release the cows from their stalls, and rotating the shaft from its second position to its first position returns the yoke means to a lowered position to close off the distal sides of the stalls;

wherein said locking means include a plurality of latches each affixed onto a respective one of said sleeve members and at least one respective cooperating portion on said shaft, each of said latches having a movable member which is movable onto and out of engagement with said cooperating portion, but is fixed angularly with respect to said sleeve member.

16. Side-by-side milking parlor according to claim 15, wherein said locking means affords a predetermined rotational play between said sleeve members and said shaft to produce a corresponding a play on the order of six inches in the yoke means at a point of contact with the cow's shoulders, so that the yoke members yieldably urge the cows gently towards the proximal sides of said stalls.

17. Side-by-side milking parlor according to claim 16 wherein each said movable member comprises a lever mounted on the associated sleeve member for swinging movement in a radial plane, and said cooperating portion comprises a flange affixed to said shaft and having a gap thereon that extends in the circumferential direction for receiving said lever, said gap being wider than the thickness of the lever in the circumferential direction to afford said predetermined play.

* * * * *